United States Patent [19]
Bylander et al.

[11] 3,985,452
[45] Oct. 12, 1976

[54] ARRANGEMENT FOR DETERMINING VISIBILITY IN THE GLIDE PATH OF AN AIRCRAFT

[75] Inventors: Magnus Bylander; Bernt Ling, both of Vasteras, Sweden

[73] Assignee: Allmanna Svenska Elektriska Aktiebolaget, Vasteras, Sweden

[22] Filed: Mar. 17, 1975

[21] Appl. No.: 559,051

[30] Foreign Application Priority Data
Apr. 30, 1974 Sweden .............................. 7405782

[52] U.S. Cl. .............................. 356/201; 250/575; 356/207
[51] Int. Cl.² ........................................ G01N 21/22
[58] Field of Search ........... 356/201, 205, 206, 207, 356/208; 250/573, 574, 575

[56] References Cited
UNITED STATES PATENTS

| | | | |
|---|---|---|---|
| 3,126,521 | 3/1964 | Brady | 250/574 |
| 3,694,936 | 10/1972 | Ling et al | 250/574 |

*Primary Examiner*—Vincent P. McGraw

[57] ABSTRACT

For determining oblique visibility, for example on an airport, a light emitter emits a light beam and is coupled with a light receiver. A plurality of devices are located at different, known distances from the light receiver, which launch measuring bodies substantially vertically with a predetermined height for each of the units. The measuring bodies are arranged to reflect the light emitted from the light emitter back to the light receiver where the visibility is sufficient. The devices are operated sequentially.

5 Claims, 3 Drawing Figures

ARRANGEMENT FOR DETERMINING VISIBILITY IN THE GLIDE PATH OF AN AIRCRAFT

BACKGROUND OF THE INVENTION

1. Field of the Invention

The present invention relates to an arrangement for determining visibility, preferably oblique visibility on airfields.

On airfields it is extremely important to be able continuously to supervise the visibility and to have accurate information as to visibility at the particular moment.

2. The Prior Art

Many different devices have been proposed to solve the problem of determining the visibility prevailing. One such device comprises a plurality of light sources arranged at different and known distances. Visibility is thus determined by the distance to the furthest light source which is visible at the moment in question. This method is thus dependent on the eyesight of the person performing the observation. Another such device comprises a light source which illuminates a reflector arranged at a relatively short distance from the light source, and a receiver which measures the intensity of the light reflected from said reflector. If visibility deteriorates, the intensity diminishes. One disadvantage with this method is that the distance between the emitter and the reflector must be short since this distance is the least which can be measured at reduced visibility. Another disadvantage is that a local disturbance, for example a bank of mist across the short measuring distance, is recorded as a general reduction in visibility.

One possibility of avoiding these disadvantages is disclosed in U.S. Pat. No. 3,694,936. In this a light emitter emits a series of light pulses towards reflectors placed at different distances. Light pulses reflected from the reflectors are detected by a receiver which, by knowing the time of emission of the pulses, is able to identify the reflector or reflectors which have caused the reflected light pulses.

In connection with landing on an airfield it is desirable, from the point of view of security, to have a knowledge of the height and distance to the point in the glide path where the pilot can see the end of the landing runway (the oblique visibility). In concrete terms this involves, among other things, information as to the visibility along a line in the direction of approach from a point in immediate connection to the end of the landing runway (the point of set-down) and to a point 3–5 km outside this point in the extension of the landing runway.

One possibility of determining this oblique visibility would be to utilize the principle according to U.S. Pat. No. 3,694,936, and in that case the reflectors would have to be placed in towers of different heights. Such a method is however not realistic from the point of view of security and expense since a long range of visibility, for example 1,000 m with a gliding angle of 3°, would require a tower of a height of 1000 × sin 3° = 52 m.

SUMMARY OF THE INVENTION

With an arrangement according to the present invention it will be possible to determine, among other things, the oblique visibility without having to erect particular stationary constructions which are a menace to security.

According to the invention, a light emitter is provided for emitting a light beam and is coupled with a light receiver. There are a plurality of units, arranged at pre-selected and different distances from the emitter, which launch measuring bodies in a substantially vertical path with a predetermined height which increases with increasing distance from the emitter. The measuring bodies have means for reflecting the light emitted from the light emitter back to the light receiver if the visibility is sufficient.

BRIEF DESCRIPTION OF THE DRAWINGS

The arrangement according to the invention will be described in more detail with reference to the accompanying drawings, in which.

DESCRIPTION OF THE PREFERRED EMBODIMENTS

Figure 1:
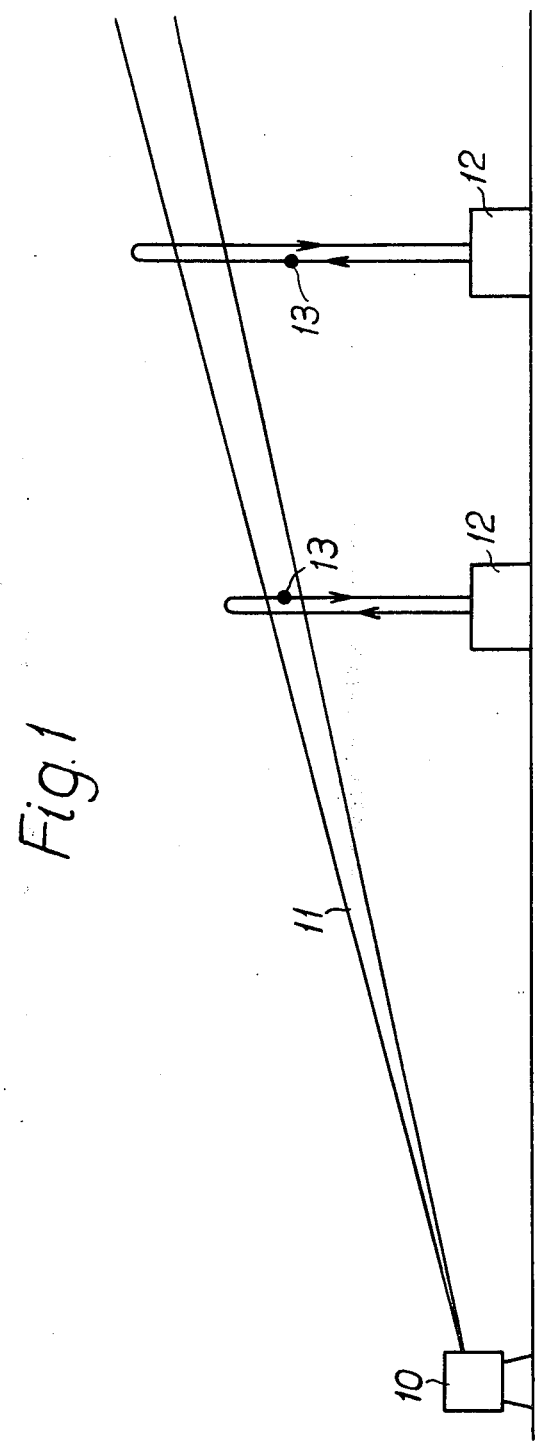
FIG. 1 illustrates an embodiment of the arrangement according to the invention, FIG. 2 a sectional view of a measuring body included in the arrangement, and FIG. 3 a launching and intercepting unit included in the arrangement according to FIG. 1.
Figure 2:
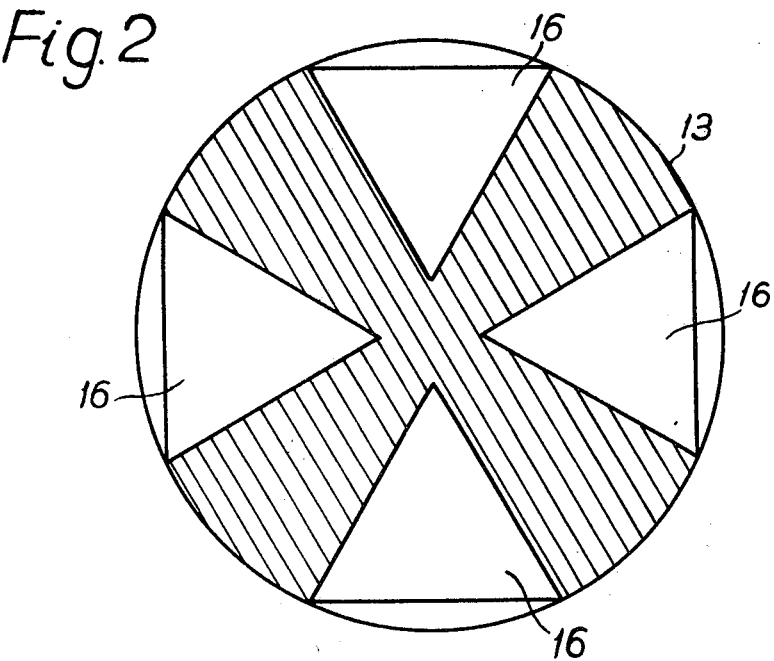

FIG. 1 shows an embodiment of the arrangement according to the invention, which consists of a combined light emitting-light receiving unit 10 arranged to emit a light beam 11 at an angle to the horizontal plane, said light beam 11 comprising the solid angle within which the oblique visibility is to be determined. At known and different distances from the unit 10 and in the direction in which the oblique visibility is to be determined there are arranged launching and intercepting units 12 for measuring bodies 13. The measuring bodies 13 suitably consist of spheres made of steel and, for example, with a diameter of from 2 to 3 cm and, as is clear from FIG. 2 showing a measuring body 13 in section, with a number of built-in prisms 16 which reflect by total reflection, a certain surface of the reflectors 16 always being hit by the light beam 11 regardless of the position of the measuring body 13. When the visibility is to be measured, a measuring body 13 is launched from the unit 12 located nearest the unit 10. (When visibility can be judged to be greater than the distance to this first unit 12, this can be inactivated and the measuring is started with the next unit 12, and so on).

The measuring body 13 is launched in a vertical path through the light beam 11 and preferably passes this twice with suitably a constant and known intermediate time interval. If the visibility is sufficient, the unit 10 will be able to detect two occasions of reflection emanating from this measuring body. If this is the case, the next measuring body 13 is launched from the unit 12 located next to the previous one, and so on. When the measuring bodies 13 return to the ground they are intercepted by the units 12.

Figure 3:
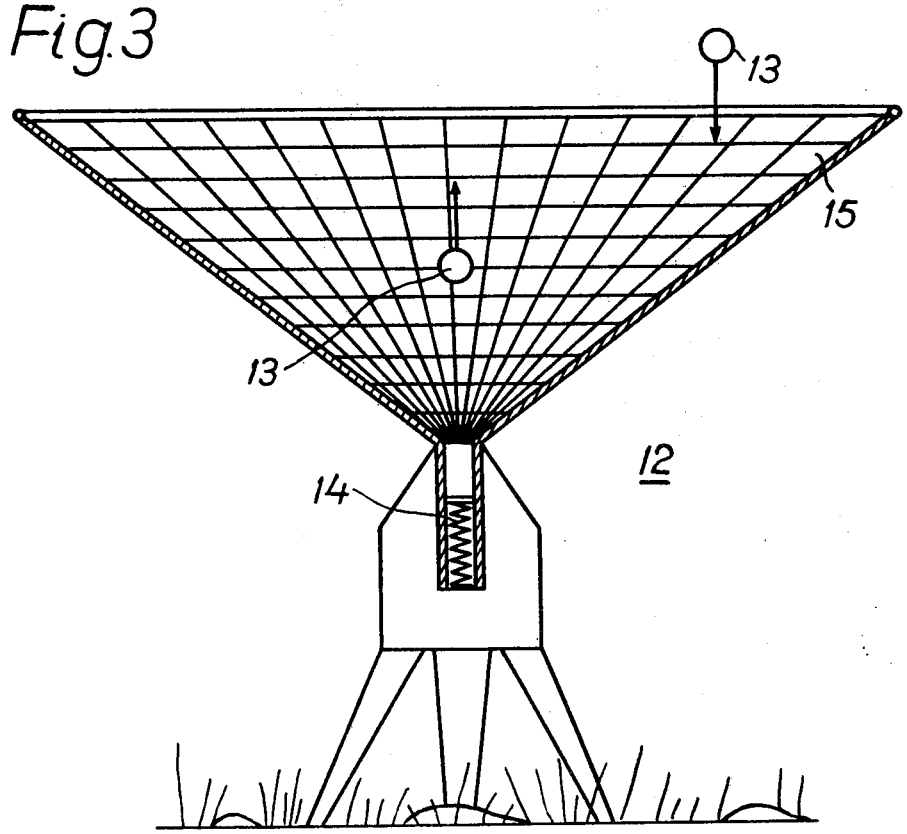

FIG. 3 discloses, partially in section, an embodiment of a launching and intercepting unit 12 for the measuring body 13. The unit 12 consists of a launching device which in its simplest form consists of a stretchable spring unit 14 which may be released and stretched by remote wire or radio control. The unit 12 further consists of an interception device in the form of a conically shaped "cloth" 15 mounted on a frame, said cloth having such an inclination that a returning measuring body 13 returns to its launching position, where the launching device 14 in the absence of the measuring body 13 resumes its firing position. The spring force may be set at a selected value but is constant with regard to the distance of unit 12 from unit 10, that is with regard to the highest desirable point of the vertical path of the measuring body 13.

The cloth 15 is suitably of a porous material, alternatively in the form of a net, to permit water to flow through it and suitably provided with a heating device for melting snow and frost.

Suitably there is a centrally arranged operating place from which the transmitter can be initiated, the units 12 can be controlled and the receiver can be read.

The units 12 can also be complemented with a cleaning of the measuring body 13 after each launching by means of showering valves arranged in the barrel of the launching device and influenced by the direction of motion of the measuring body 13.

The arrangement according to the invention should be complemented with a device measuring the wind direction and wind force, so that a suitable measuring opportunity can be chosen. If it is desired to perform measurements under harder wind conditions, which normally carry the measuring body outside the interception device, the launching device can be made rotatable so that launching can be performed against the wind at an angle with the vertical line, the measuring body thus falling within the desired area also in this case.

According to an alternative to the above embodiment of the arrangement according to the invention, the units 12 can be replaced with devices generating a lifting force, such as propeller rotors, jet engines, provided with a picketed rope system, said devices being activated during measuring, and the reflecting measuring bodies which are mounted on these devices are then moved to a position within the emitted light beam. By controlling the rope stresses a stabilizing effect is obtained in the vertical direction. Measuring devices mounted for measuring the rope angle may, in case of wind operation, supply information to the light emitter which is then able to correct the position of the light beam within certain tolerances.

The arrangement according to the invention is not, of course, limited to the embodiments described here but can naturally be varied in many ways within the scope of the following claims.

We claim:
1. Arrangement for determining oblique visibility, comprises a light emitter arranged to emit a light beam and a light receiver, said emitter and receiver being ground-mounted, and a plurality of members, arranged at different distances from the light receiver, said members including means for launching measuring bodies in free flight in a substantially vertical path with a predetermined height for each member, each measuring body including means to reflect the light emitted from the light emitter against the light receiver if the visibility is sufficient.

2. Arrangement according to claim 1, in which a measuring body comprises in its surface reflectors reflecting by total reflection.

3. Arrangement according to claim 1, in which the measuring bodies at times different from the measuring opportunities are substantially situated on ground level.

4. Arrangement according to claim 1, in which a measuring body is arranged to be positioned in said light beam twice during each measuring opportunity.

5. Arrangement according to claim 1, in which the arrangement comprises an interception device for intercepting the measuring body when it returns to ground level.

* * * * *